May 5, 1964  G. ALPERT  3,131,489
DEVICE FOR TEACHING TIME
Filed April 23, 1963

INVENTOR.
GERALD ALPERT
BY *Jerome Bauer*
ATTORNEY

United States Patent Office 3,131,489
Patented May 5, 1964

3,131,489
DEVICE FOR TEACHING TIME
Gerald Alpert, 2 Edge Lane, Wantagh, N.Y.
Filed Apr. 23, 1963, Ser. No. 275,091
4 Claims. (Cl. 35—39)

This invention relates to an educational device and more particularly to one that will aid in teaching how to read time.

An object of the invention is to provide a device that duplicates the features of an actual working time piece, but so simplifies the form and arrangement of the normal details of a clock face as to make it clear and readily apparent to those who are unable to read time as to the elements involved in time reading.

Another object and feature of the invention resides in the provision of a novel arrangement of separate hour and minute scales which may be used by the novice or beginning reader of time and which may subsequently be merged together into a single combined hour and minute scale having the appearance of a clock face for use by the experienced time reader.

Another object of the invention is to provide a teaching device that will retain the attention of the student by enabling him to manipulate not only the clock hands, but also the time scales thereby increasing the incentive for more rapid learning.

Other and further objects of this invention reside in the structures and arrangements hereinafter more fully described with reference to the accompanying drawing in which.

Figure 2:
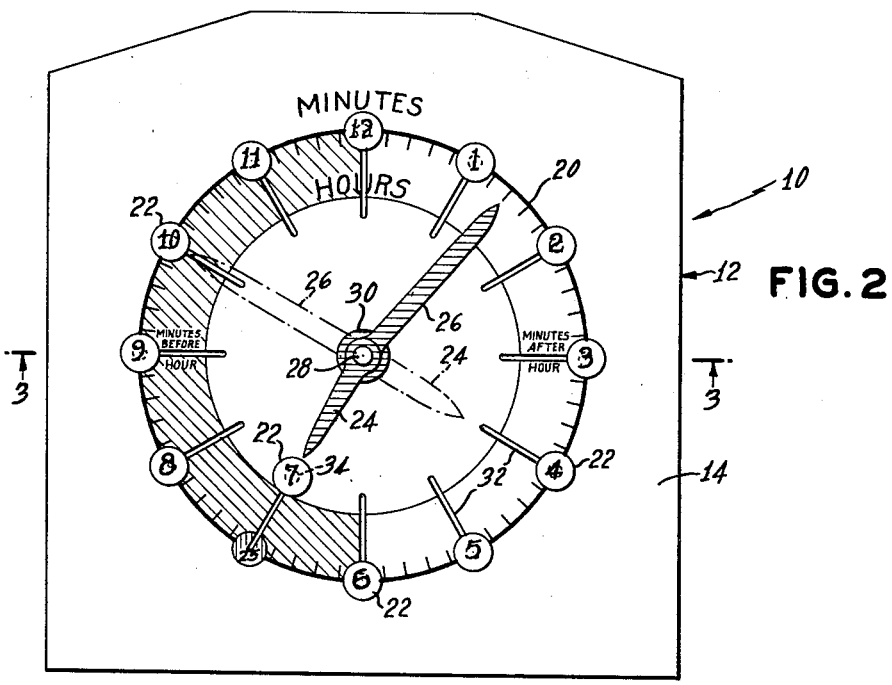
FIG. 2 is an enlarged view of FIG. 1 illustrating members of the hour scale displaced to the minute scale.
Figure 3:
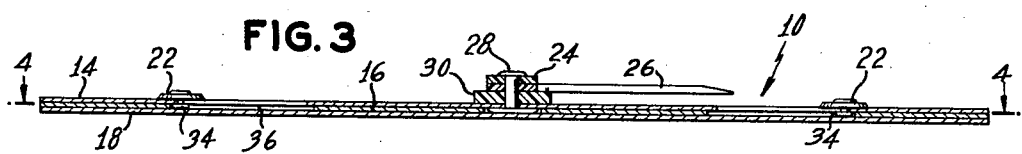
FIG. 3 is a cross-section taken along lines 3—3 of FIG. 2.
Figure 4:
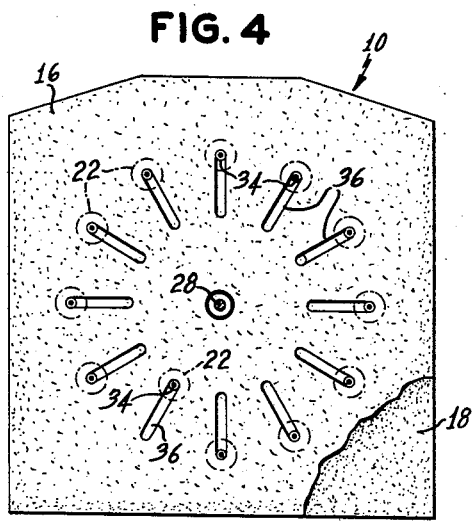
FIG. 4 is a reduced cross-section of FIG. 3 taken along lines 4—4.

Referring now to the drawing, the teaching device there shown is generally identified by the numeral 10 and includes a body 12. The body 12 is illustrated in the drawing as being composed of three members, a top member 14, an intermediate member 16 and a bottom member 18. As the description proceeds, those who are skilled in the art should recognize that this arrangement of the body structure 12 is not to be deemed limiting on the scope of the invention, but rather, solely illustrative of the form which the invention may take. Hence, the body 12 may be constructed as a single member and still not depart from the spirit of the invention.

The top member 14 displays a clock face that includes a numbered minute scale 20 and also an hour scale that is defined by a plurality of numbered members 22. The members 22 are numbered from 1 to 12 inclusive and depict, in the usual manner, the twelve hours of each half day. Both the hour scale and the minute scale 20 are shown circularly shaped to provide for a proper relationship between hour and minute hands to be described. However, the circular shape is convenient for use with rotating clock hands. Because both the hour and minute scales have different diameters, the hour scale is located concentrically within the minute scale. Together, the circularly arranged hour and minute scales define an annular area between them.

The minute scale 20 is uniquely divided to define symmetrically numbered parts both to the right and left of the o'clock and half past o'clock positions thereon. Beginning at the hour or o'clock position, it will be noted that the minute scale 20 is numbered in minutes clockwise starting with "0" and ending with "30" positioned at the half past o'clock. Reading in a counterclockwise position and starting with the "0" minute at the hour or o'clock position, the minute scale 20 is similarly divided and numbered up to "30" terminating at the half hour or the half past o'clock position. Thus, both the right and the left sides of the minute scale 20 are symmetrically numbered in minutes from "0" to "30." On both the right and left side of the minute scale every five minute division or index between the "0" and the "30" minutes is numbered. Each of the five minute numbers is radially aligned with a respective one of the hour members 22 for a purpose to be described.

Those who are skilled in reading time will immediately realize that the minutes on the right side of the minute scale 20 reading clockwise from "0" minutes to "30" minutes are normally read as minutes "after" the hour. In opposite manner, the minutes located on the minute scale 20 reading clockwise from "30" to "0" are normally read as minutes "before" the hour. To those who are unskilled in reading time, this simple understanding is not apparent. Therefore, to more fully portray the "after" and "before" minute readings, the annular area defined between the hour and minute scales is divided into two portions each of which is correspondingly located to the right and left of an imaginary line drawn diametrically through the "0" and "30" minute indices on the minute scale. Each of these two portions is distinctly distinguished one from the other either by color, or as shown in FIG. 2 of the drawing, the left hand portion is cross-hatched to distinguish those minutes to be read "before" the hour from those minutes to be read "after" the hour.

Pivotally mounted on the body 12 for rotation relative to each other and to their respective hour and minute scales are hour and minute hands 24 and 26. The hands 24 and 26 are mounted on a pivot 28 and are supported for rotation on a spacer 30 that serves to space the hands above the clock face and for rotative movement above the height of the numbered hour members 22. An interesting feature of the invention results in the provision and arrangement of the hour and minute hands 24 and 26. It will be noted that the hours and minutes each have their respective scales. The hour hand 24 is no longer than the radius of the hour scale while the minute hand 26 is longer than the radius of the hour scale. This arrangement assures that the hour hand 24 always will be positioned to point directly to the numerals of the hour scale and that the minute hand 26 always points to the minute divisions of the minute scale 20. This is important to beginners who are just starting to learn how to read time since each hand can be made to point only to its respective scale and confusion as to which scale is intended by the pointing hand is obviated.

Figure 1:
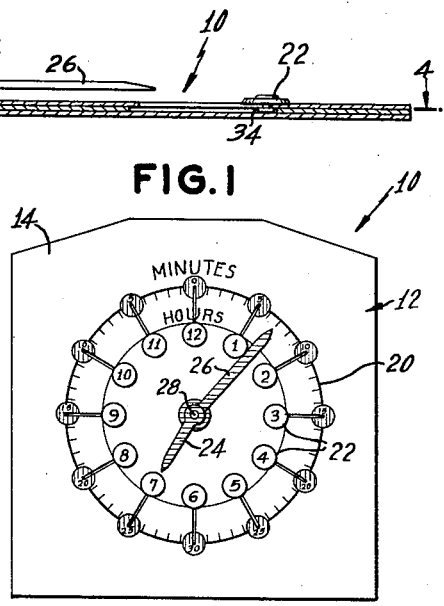
FIG. 1 is an elevational view of a device for teaching the reading of time constructed according to the invention.

The numbered minutes on the minute scale 20 have been described as being radially aligned with the numbered members 22 defining the hour scale. In addition to being radially aligned with each other, the hour and minute scales are also joined together by radially directed guide slots 32 which extend from the normal hour position of the hour members 22 radially outward to the correspondingly radially aligned minute position on the hour scale 20. Thus, the hour numeral members 22 are adapted to be moved radially between their hour scale position as illustrated in FIG. 1 and into covering relationship over the correspondingly aligned minute numeral on the minute scale 20 to cover and obscure the same from view as is illustrated, in part, in FIG. 2. The numbered hour members 22 are guided in their respective slots 32 and each has an enlarged head 34 that moves in an enlarged opening 36 defined in the intermediate one of the body members 16. The enlarged head 34 thereby prevents the accidental removal of the hour numeral member 22 from the clock face and serves to guide the numeral in its radial movement between the minute scale 20 (FIG. 2) and its hour scale position as shown in FIG. 1.

FIG. 1 illustrates the relative arrangement of details of the teaching device for use by a beginning student. The hour numeral members 22 are all moved radially inward along their slots 32 to their normal hour position as shown, thereby leaving the minute numerals uncovered and visible for reading. The hour and minute hands 24 and 26 are then rotated about the pivot 28 to assume a position such as that illustrated in FIG. 1. FIG. 1 illustrates the position of 7 minutes after 7 o'clock. The student will immediately recognize that the hour hand 24 points only to the "7" numeral on the hour scale while the minute hand 26 points only to the "7" minute division or index on the minute scale 20. The student will then know that the "7" minutes is to be read as being "after" 7 o'clock since the minute hand 26 is located within that annular portion of the clock face that distinguishes the "after" minutes from the "before" minutes of the hour.

By careful arrangement of the hour and minute hands 24 and 26, the student will rapidly learn the time relationship of minutes "before" and "after" the hour, the hour to be read being depicted by the location of the hour hand 24 with respect to the hour scale. The student is not encumbered by having to learn that there are sixty minutes in an hour since it is only necessary for him to initially learn that there are only up to thirty minutes after the hour and thirty minutes before the hour. Thus, initially, the student will recognize the location of the hour hand 24 and the location of the minute hand 26 with respect to the "after" and "before" hour position on the minute scale 20.

After the student becomes proficient in his ability to read time with the device 10 arranged as in FIG. 1, the task can be made more complex and to approximate the usual clock face. That is to say, the hour numeral members 22 now may be moved from their hour scale position as shown in FIG. 1 radially outward along their guiding slots 32 to the minute scale 20. When so moved, each hour numeral member 22 is adapted to cover and obscure from view the minute numerals shown on the minute scale 20 of FIG. 1. This may be seen more clearly in FIG. 2 where all but the hour numeral member 22 depicting the hour "7" have been moved radially outward to the minute scale. The arrangement of the clock face in FIG. 2 now approximates that of the usual clock face and the student can now learn that when the hour hand 24 points to the seventh hour and the minute hand 26 points to the seventh minute, the time is to be read as seven minutes after seven o'clock. However, the student never tends to lose interest in learning because of the versatility of the device 10 and the ability of the student to obscure any desired one of the five minute divisions and still test his ability to read the time of the hour. By this time, the student will have learned that the minutes obscured by the hour numeral members 22 in FIG. 2 are still there and must be read in the same manner as previously taught with respect to FIG. 1.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore to be limited only as indicated by the scope of the claims appended hereto.

I claim:
1. A device to teach time comprising a clock face including a numbered minute scale and an hour scale position, said hour scale position being arranged within said minute scale, said hour scale being defined by a plurality of members each of which is numbered consecutively in a clockwise direction from 1 to 12, each of said members being displaceable from their respective hour scale position to said minute scale, means on said clock face cooperable with said displaceable members to enable the same to remain in their displaced positions from said hour scale to said minute scale, and hour and minute hands pivotally mounted on said clock face for movement relative to each other and to their respective hour and minute scales.

2. A device to teach time as in claim 1, the numbers on said minute scale being located clockwise between 0 and 30 minutes after the hour and the numbers on said minute scale located clockwise between 30 and 0 minutes defining two parts on said minute scale, each of said parts being distinguishable one from the other and each of said parts indicating which of said minutes on said minute scale between said 0 and 30 minutes are to be read after or before the hour indicated by said hour hand.

3. A device to teach time comprising a clock face including a numbered minute scale and an hour scale position, said hour scale position being arranged within said minute scale, said hour scale being defined by a plurality of members each of which is numbered consecutively in a clockwise direction from 1 to 12, each of said members being movable from their respective hour scale position to said minute scale, and hour and minute hands pivotally mounted on said clock face for movement relative to each other and to their respective hour and minute scales, a plurality of slots defined in said clock face, each of said slots extending from said minute scale to a respective one of said members defining said hour scale when said members are in their hour scale position, means on each of said members connecting the same with said clock face and having means thereon movable in its respective slot to enable its member to move between said minute scale and said hour scale position.

4. A device to teach time comprising a clock face having a numbered minute scale and a numbered hour scale in circumscribed relationship, the numbers of said minute scale being predeterminately related with certain ones of the numbers of said hour scale, a plurality of members each including a respective one of said numbers of said hour scale, said members each being displaceable from its hour scale to the position of its related one of said numbers of said minute scale, and means on said clock face cooperable with each of said members when the same is displaced from its hour scale position to the minute scale to enable the same to retain its displaced position at said minute scale.

References Cited in the file of this patent
UNITED STATES PATENTS

| | | |
|---|---|---|
| 1,000,181 | Larkin | Aug. 8, 1911 |
| 2,172,450 | Pitcher | Sept. 12, 1939 |
| 2,853,850 | McLeod | Sept. 30, 1958 |

FOREIGN PATENTS

| | | |
|---|---|---|
| 827,064 | France | Apr. 15, 1938 |
| 926,995 | France | Apr. 28, 1947 |